(12) United States Patent
Hsu

(10) Patent No.: US 6,464,160 B2
(45) Date of Patent: Oct. 15, 2002

(54) TAPE MEASURE HAVING QUICK REWINDING MECHANISM

(76) Inventor: Cheng-Hui Hsu, 126-128 Pao Chung Rd., Hsien Tien, Taipei Hsien (TW)

( * ) Notice: Subject to any disclaimer, the term of this patent is extended or adjusted under 35 U.S.C. 154(b) by 0 days.

(21) Appl. No.: 09/828,180

(22) Filed: Apr. 9, 2001

(65) Prior Publication Data

US 2001/0038055 A1 Nov. 8, 2001

Related U.S. Application Data

(63) Continuation-in-part of application No. 09/563,747, filed on May 4, 2000, now abandoned.

(51) Int. Cl.7 .............................. B65H 75/40; G01B 3/10
(52) U.S. Cl. ......................................... 242/395; 33/761
(58) Field of Search .............................. 242/395, 395.1, 242/405.3, 268; 33/761–769; 254/342; 74/414

(56) References Cited

U.S. PATENT DOCUMENTS

| | | | |
|---|---|---|---|
| 348,805 A | * 9/1886 | Wheeler | 242/395.1 |
| 1,058,311 A | * 4/1913 | Lewis et al. | 242/395.1 |
| 1,459,454 A | * 6/1923 | Trotteer | 74/414 |
| 1,572,001 A | * 2/1926 | Dotzert | 254/342 |
| 2,066,779 A | * 1/1937 | Himmel | 254/342 |
| 2,168,814 A | * 8/1939 | Willgoos | 74/414 |
| 4,813,625 A | * 3/1989 | Takeda | 242/395 |
| 5,678,452 A | * 10/1997 | Frazier | 254/342 |
| 6,134,801 A | * 10/2000 | Miyasaka | 33/767 |

* cited by examiner

Primary Examiner—John M. Jillions
(74) Attorney, Agent, or Firm—Bacon & Thomas, PLLC

(57) ABSTRACT

A tape measure having a quick rewinding mechanism. The mechanism includes a gear assembly having a first drive gear, a second drive gear, and an idler gear set having first, second, third, and fourth idler gears each meshed with the first drive gear, wherein the idler gears are equally spaced around the first drive gear for uniformly distributing a generated force to the idler gears while rewinding the tape measure device.

1 Claim, 6 Drawing Sheets

TAPE MEASURE HAVING QUICK REWINDING MECHANISM

CROSS-REFERENCES TO RELATED APPLICATION

The present application is a continuation-in-part of a pending application filed on May 4, 2000, Ser. No. 09/563,747, entitled "Tape Measure With Quick Rewinding Mechanism" now abandoned. The teaching thereof is incorporated herein by reference.

FIELD OF THE INVENTION

The present invention relates to measuring devices and particularly to a tape measure having a quick rewinding mechanism with improved characteristics.

BACKGROUND OF THE INVENTION

A conventional tape measure 1 is shown in FIGS. 1 to 3*b* wherein a gear assembly 20 is provided in a hub, a first gear 21 is in a spindle in the hub, and a second driven gear 23 is on a lower cap thereof. The diameter of first gear 21 is larger than that of second driven gear 23. Two opposed shafts 311 are provided with the idler gear set (i.e., idler gears 22*a* and 22*b*) sleeved thereon. Further, a smaller gear is meshed with first gear 21 while a larger gear is meshed with the second driven gear 23. With the first gear 21 and second driven gear 23 rotated about the same axis and in meshing cooperation with idler gears 22*a* and 22*b*, a quick rewinding is carried out.

However, the previous design suffered from several disadvantages. For example, the idler gear (i.e., shaft 311) tends to break thus malfunctioning the gear assembly. This is best illustrated in FIG. 1. Further, the tape measure tends to vibrate irregularly, thus causing inconvenience to user. This is best illustrated in FIG. 2. After analysis, it is found that the breaking of shafts 311 is caused by an excess force exerted thereon while performing a quick rewinding (see FIG. 3*a* and 3*b*). In a clockwise rewinding of tape measure, force exerted on idler gear 22*a* by first gear 21 has a first component force along the X axis and a second component force along Y axis. In other words, a resultant force, generated along Z axis, is perpendicular to and exerted on shaft 311 (FIG. 3*a*). Thus shaft 311 (i.e., idler gear 22*a*) tends to break after a long time of use while idler gear 22*b* is undamaged (FIG. 1). In one consideration, the diameter of shaft 311 is increased in order to increase the durability of shaft 311. However, this may adversely affect the strength of idler gears. In another consideration, the diameters of idler gears are also increased. However, this must significantly change the construction of the tape measure. Also, this will inevitably increase the size thereof. Thus, it is not practical. Moreover, first gear 21 is provided between two idler gears 22*a* and 22*b* and only supported by them. This is not a stable design as illustrated in FIG. 2. Also, such drawback is not solved even when the diameters of shafts 311 (i.e., the rotation axes of idler gears 22*a* and 22*b*) are increased. Hence, further improvement is required.

SUMMARY OF THE INVENTION

It is an object of the present invention to provide a tape measure device having a quick rewinding mechanism comprising a gear assembly including a first drive gear, a second drive gear, and an idler gear set having a first, a second, a third, and a fourth idler gears each meshed with the first drive gear wherein the idler gears are equally spaced around the first drive gear. This can uniformly distribute a generated force to the idler gears while rewinding the tape measure device.

The above and other objects, features and advantages of the present invention will become apparent from the following detailed description taken with the accompanying drawings.

DETAILED DESCRIPTION OF THE PREFERRED EMBODIMENTS

Figure 1:
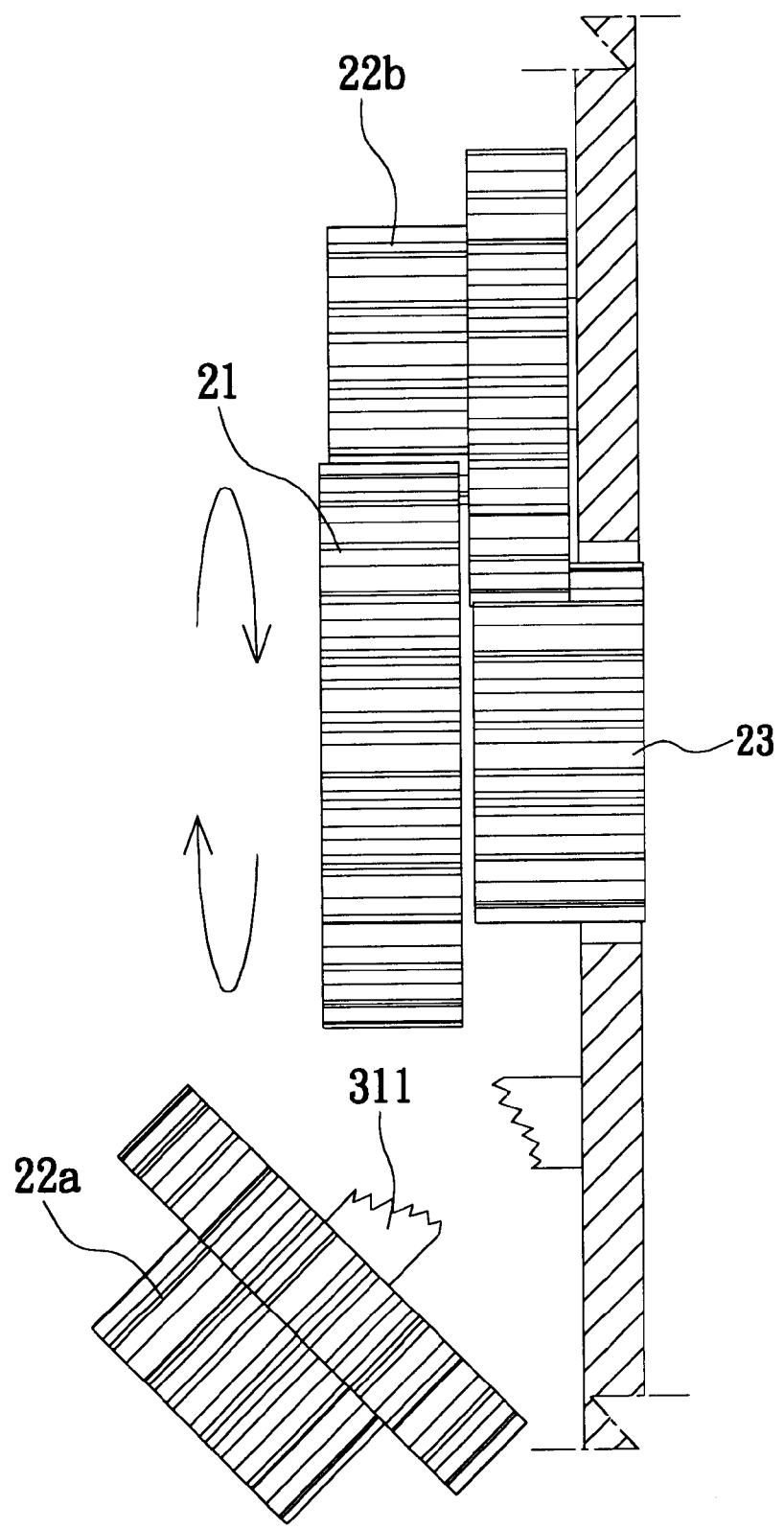
FIG. 1 is a sectional view of a conventional tape measure with a quick rewinding mechanism for illustrating a first drawback thereof (i.e., breaking of the shaft)
Figure 2:
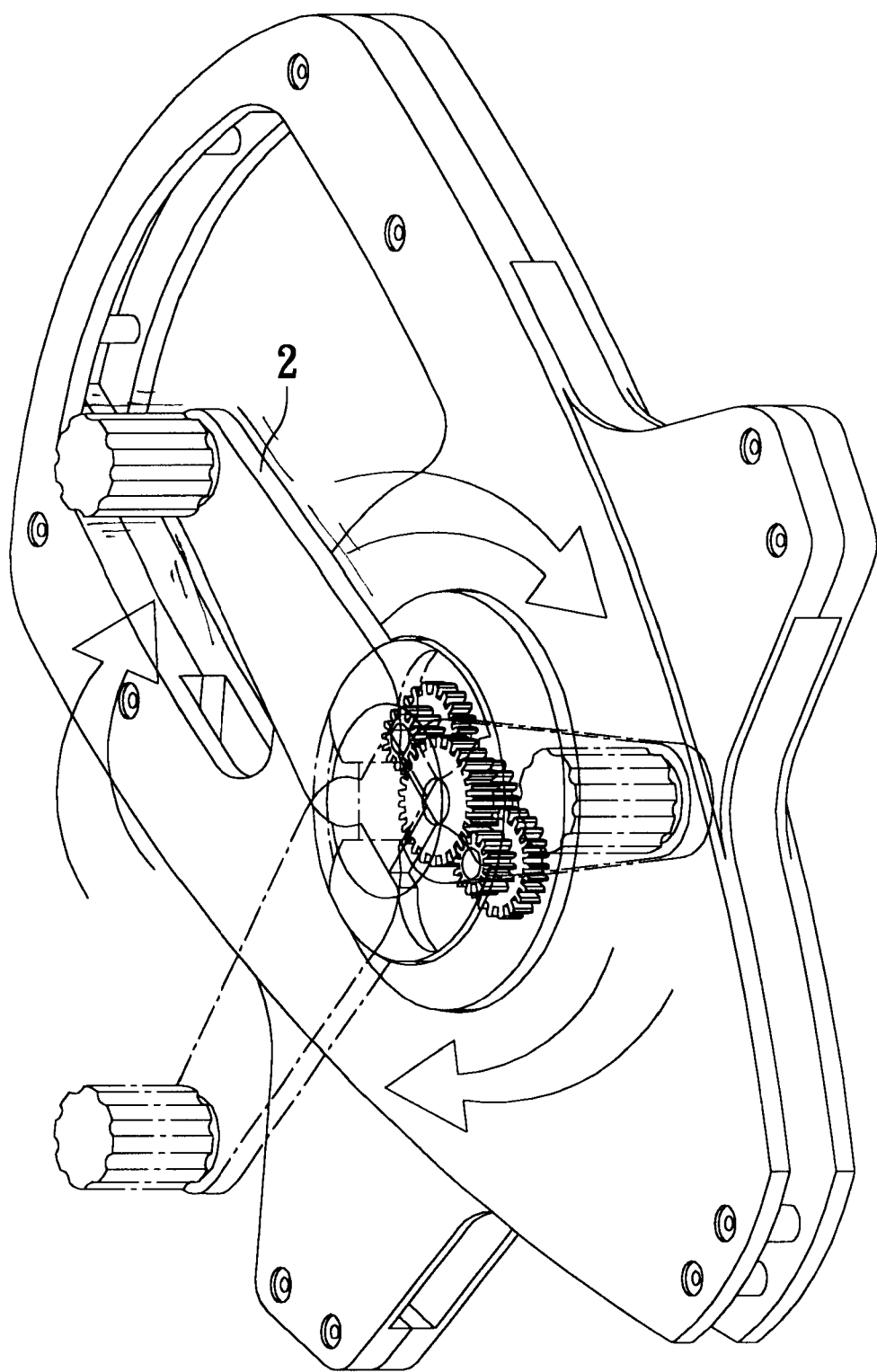
FIG. 2 is a perspective view of FIG. 1 illustrating a second drawback thereof (i.e., irregular vibration while rewinding)
Figure 3A:
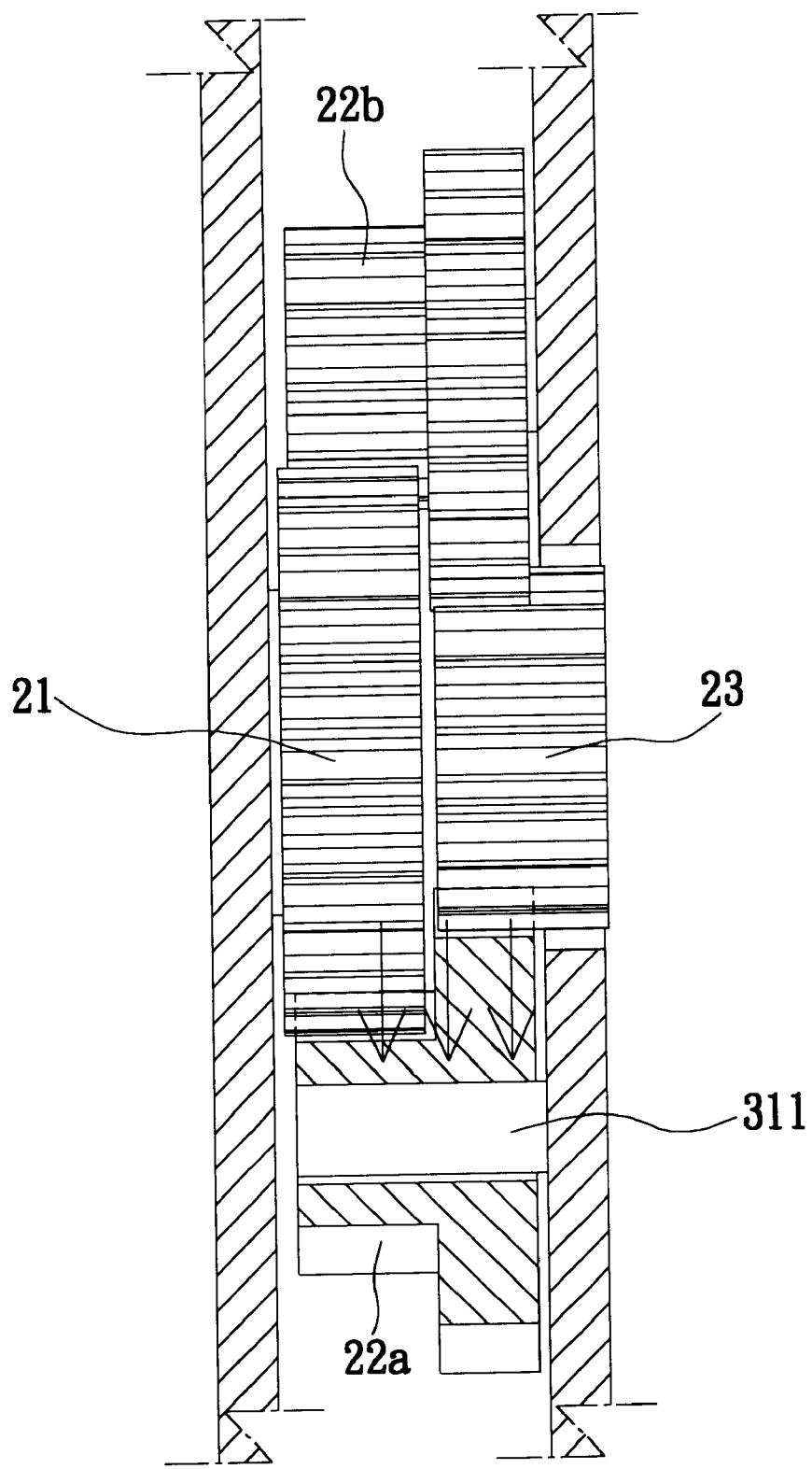
FIG. 3*a* is a partial sectional view of FIG. 2 for illustrating the causes of the first drawback.
Figure 3B:
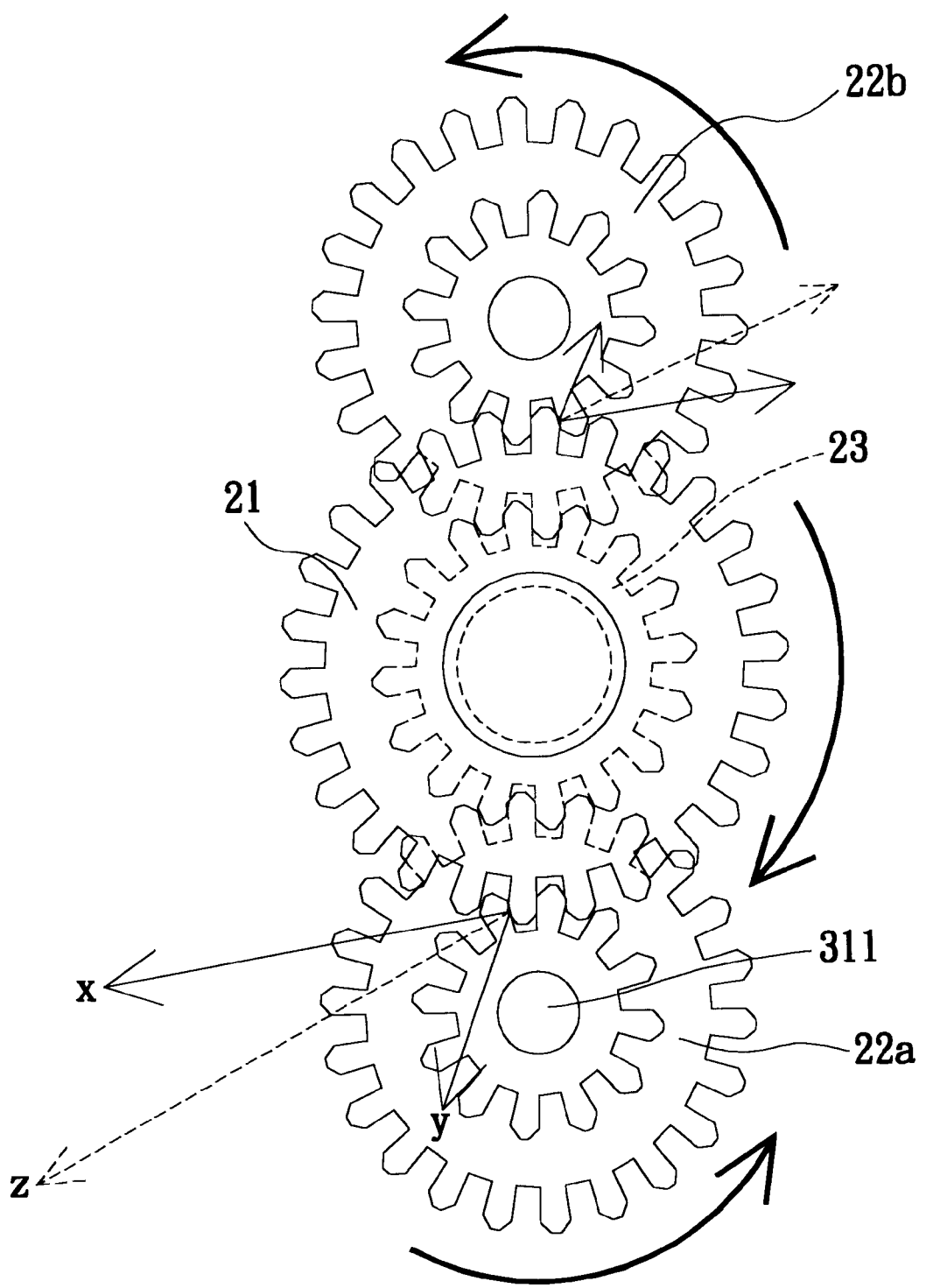
FIG. 3*b* is a side view of FIG. 3*a* for illustrating the causes of the first drawback.
Figure 4:
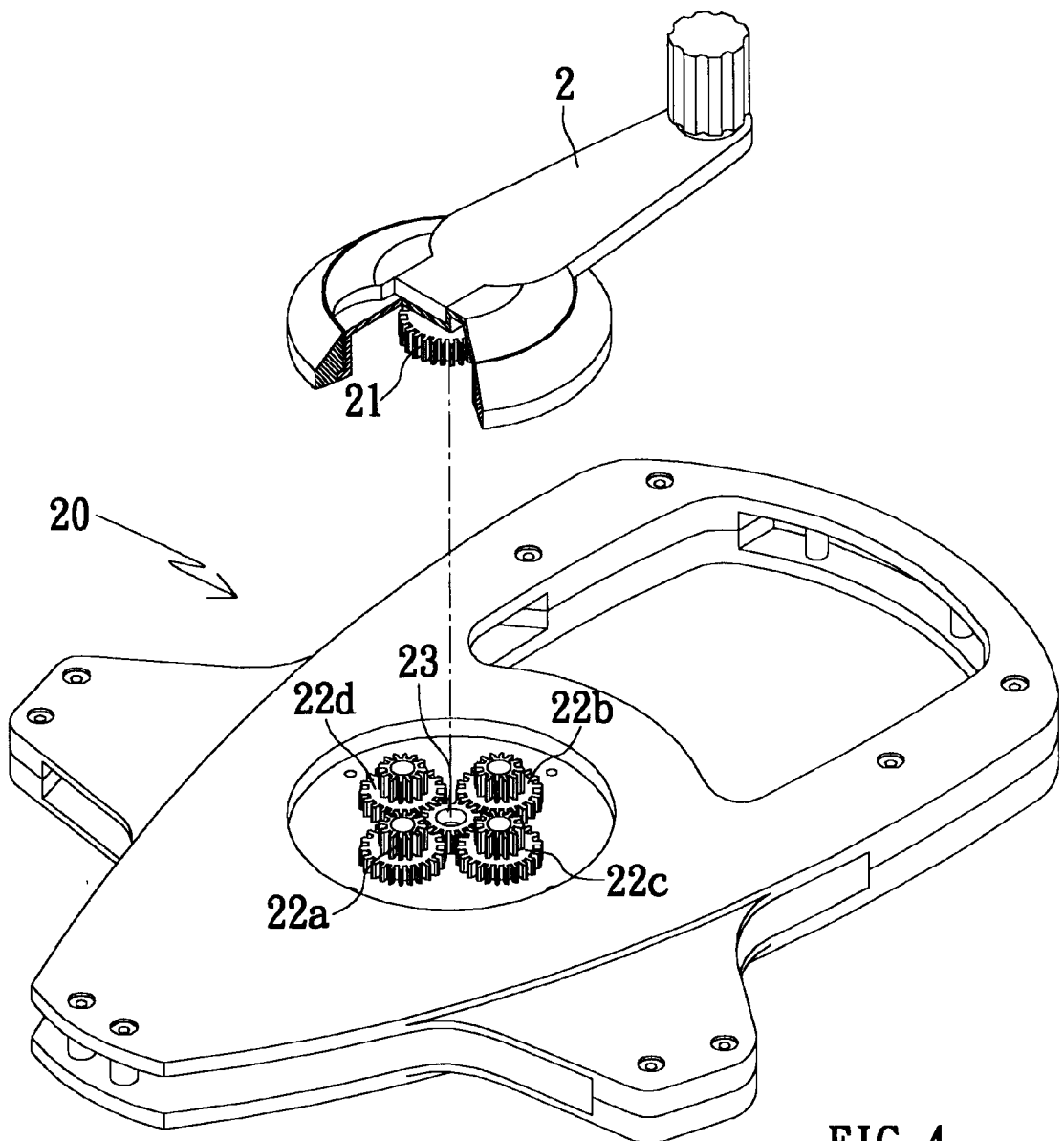
FIG. 4 is an exploded perspective view of a tape measure having a quick rewinding mechanism according to the invention.
Figure 5:
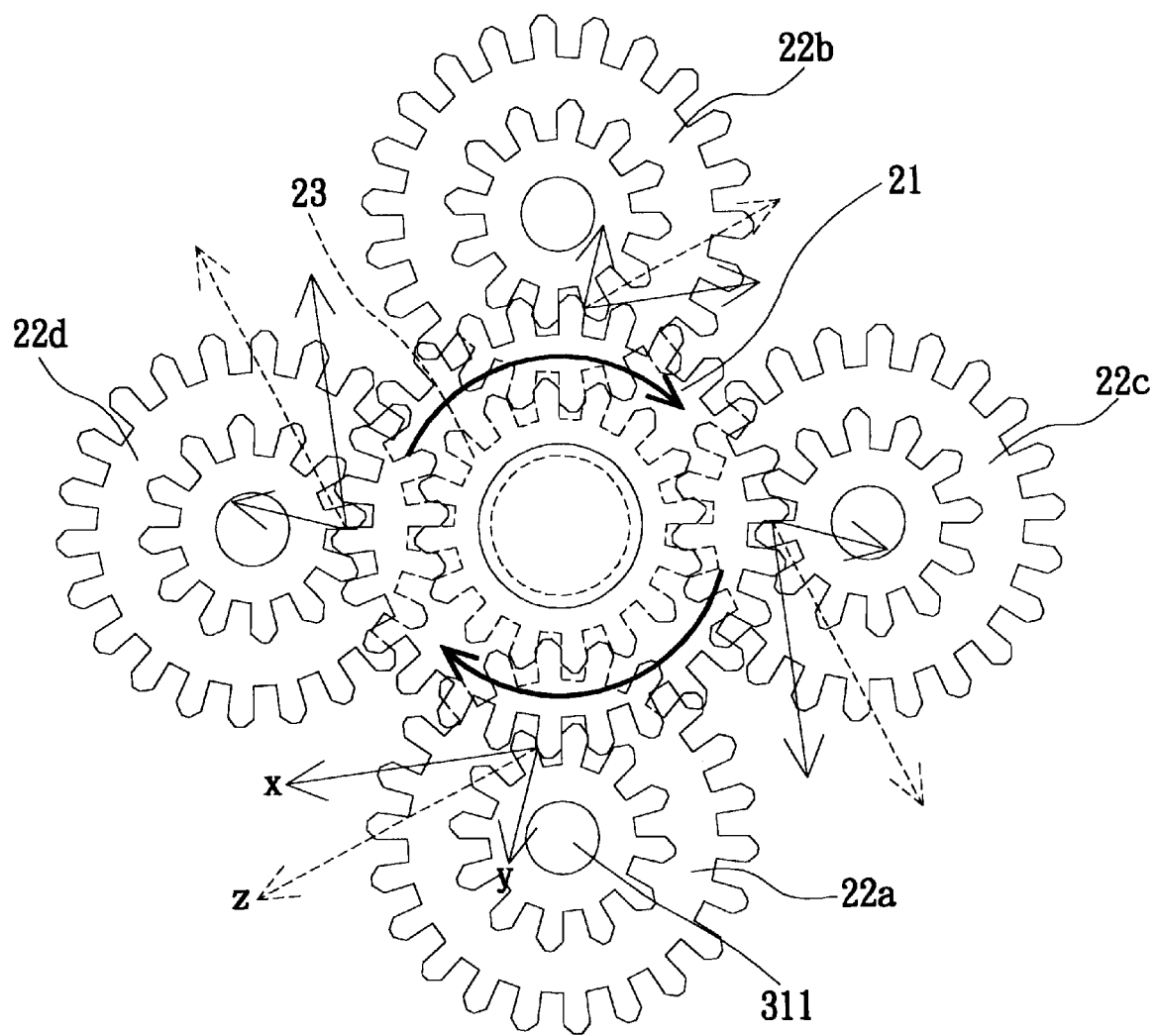
FIG. 5 is a side view illustrating the meshing and operating relationship among gears of the gear assembly of FIG. 4.

Referring to FIGS. 4 and 5, there is shown a tape measure having a quick rewinding mechanism constructed in accordance with the invention. The characteristics of the invention is that two idler gears 22*c* and 22*d* are added to be meshed with first gear 21 in addition to the already provided idler gears 22*a* and 22*b* which are also meshed with first gear 21. As shown, four idler gears 22*a*, 22*b*, 22*c*, and 22*d* are equally spaced around first gear 21. This distributes force generated while rewinding the tape measure more uniformly to the four idler gears 22*a*, 22*b*, 22*c*, and 22*d*. In detail, a component force exerted on the idler gear 22*a* along the Z axis is uniformly distributed to idler gears 22*c* and 22*d*. Hence, a dynamic balance of rotation force is carried out on the gear assembly. As a result, shaft 311 does not tend to break while rewinding. As shown in FIGS. 4 and 5, a crank is pivotable about a hub, and a spindle extends downwards from the hub.

While the invention herein disclosed has been described by means of specific embodiments, numerous modifications and variations could be made thereto by those skilled in the art without departing from the scope and spirit of the invention set forth in the claims.

What is claimed is:

1. A tape measure device comprising:

a hub;

a crank pivotable about the hub;

a spindle extended downwards from the hub; and a gear assembly including a first drive gear sleeved on the spindle, a second drive gear pivotably sleeved on the spindle, and at least four idler gear sets, each of the idler gear sets comprising a small idler gear and a large idler gear secured to and positioned below respective ones of the small idler gears, the first drive gear is meshed with the small idler gears of the at least four idler gear sets that are equally spaced apart from the first drive gear, and the second drive gear is meshed between the large idler gears of the at least four idler gear sets, thereby uniformly distributing force generated by the rotation of the crank to the idler gears while rewinding the tape measure device.

* * * * *